3,507,311
FRUIT HARVESTING CONTAINER
Zacariah J. Wilson, 534 S. Brooksville Ave.,
Brooksville, Fla. 35512
Filed June 26, 1968, Ser. No. 740,121
Int. Cl. A01g 19/06
U.S. Cl. 150—2        7 Claims

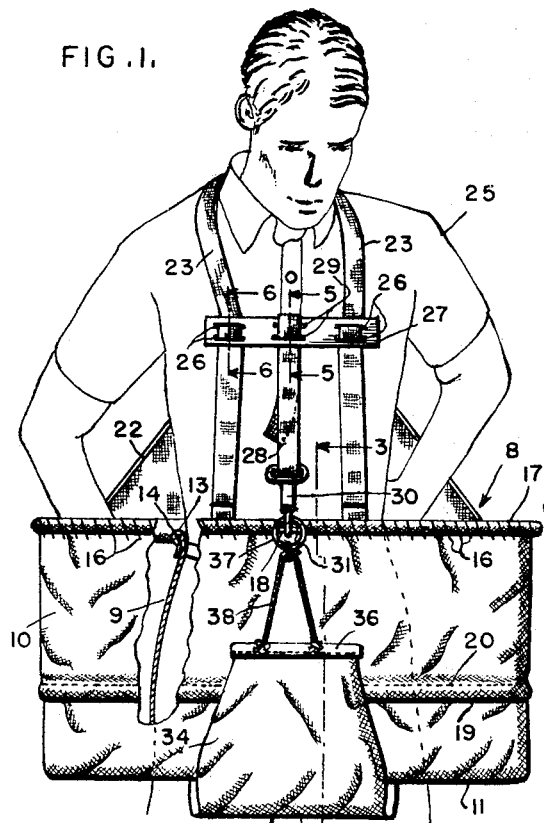
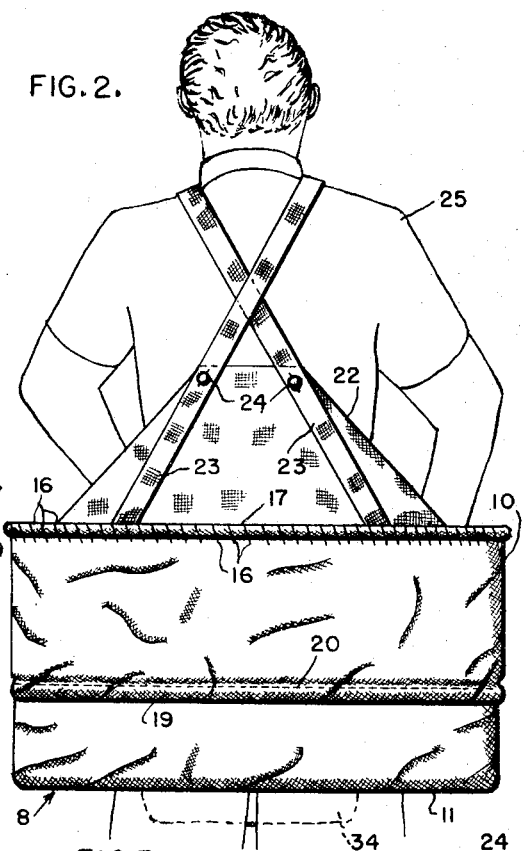
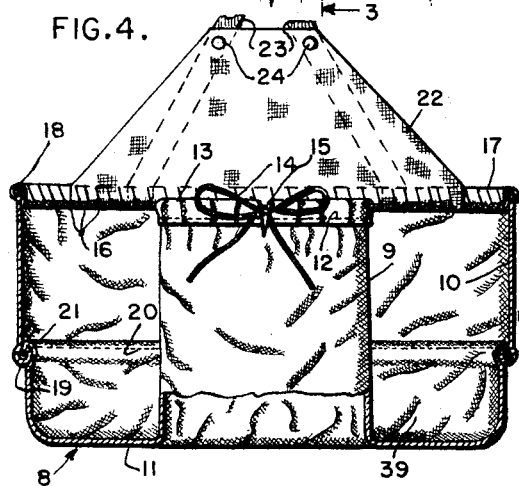
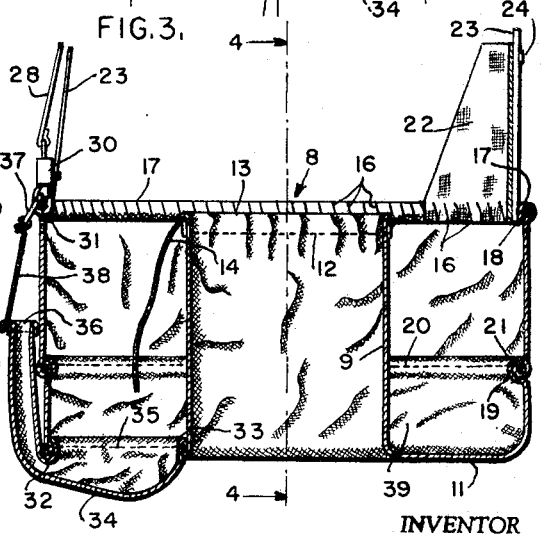
FIG. 1. FIG. 2. FIG. 3. FIG. 4. FIG. 5. FIG. 6.
INVENTOR
ZACARIAH J. WILSON
BY John N. Randolph
ATTORNEY United States Patent Office 3,507,311
Patented Apr. 21, 1970

ABSTRACT OF THE DISCLOSURE

A container worn by a fruit picker composed of a heavy fabric, such as duck, including an inner wall which engages around the torso of the wearer, an outer annular wall which is spaced from said inner wall and annnular bottom connecting the bottom edges of the inner and outer walls and defining an upwardly opening annular chamber for receiving the picked fruit. The outer wall is supported by adjustable shoulder straps, and a discharge chute extends downwardly from an opening in the bottom and is held closed, except when discharging the fruit, by being folded upwardly over a part of the outer wall and detachably connected to one of the straps.

SUMMARY

It is a primary object of the present invention to provide the receptable or container which can be conveniently worn by a fruit picker and which provides a relatively large open top annular chamber in which the picked fruit is deposited and stored until the picker is ready to empty the container.

Another object of the invention is to provide such a container having a discharge chute extending from a part of the container bottom which is normally held closed, except when released for discharging the fruit into a storage receptacle and which can be conveniently accomplished without removing the container from the body of the wearer.

Still another object of the invention is to provide shoulder engaging straps for supporting an outer wall of the container at a desired height, which may be readily adjusted to accommodate the container to wearers of different sizes, and which will afford a minimum of obstruction to the deposit of fruit into the container.

A further object of the invention is to provide a container formed primarily of a heavy fabric, an inner wall of which is fastened around the torso of the wearer and which includes means for holding an outer wall thereof spaced outwardly from said inner wall.

Various other objects and advantages of the invention will hereinafter become more fully apparent from the following description of the drawing, illustrating a presently preferred embodiment thereof.

BRIEF DESCRIPTION OF THE DRAWING

FIGURE 1 is a front elevational view, partly broken away, showing the fruit picking container in an applied position;

FIGURE 2 is a rear elevational view thereof;

FIGURE 3 is a fragmentary vertical sectional view, taken substantially along a plane as indicated by the line 3—3 of FIGURE 1;

FIGURE 4 is a vertical sectional view, taken substantially along the lines 4—4 of FIGURE 3, and FIGURES 5 and 6 are enlarged transverse sectional views, taken substantially along planes as indicated by the lines 5—5 and 6—6, respectively, of FIGURE 1.

DESCRIPTION OF THE PREFERRED EMBODIMENT

Referring more specifically to the drawing, the fruit harvesting container in its entirety and comprising the invention, is designated generally 8 and includes an inner annular wall 9, an outer annular wall 10 and an annular bottom 11 which extends between bottom edges of the walls 9 and 10. The parts 9, 10 and 11 are preferably formed of a heavy fabric material, such as duck. The upper edge of the inner wall 9 is turned back upon itself and stitched, as seen at 12, to provide a fold 13 in which a drawstring 14 is mounted for slidable movement. The ends of the drawstring extend outwardly through an opening 15 in the fold 13 at the front of the wall 9.

The upper edge of the outer wall 10 is folded back upon itself and stitched, as seen at 16, to provide a fold 17 containing a rigid top ring 18. The outer wall 9 has a second fold 19 secured by stitching 20 which is located nearer its bottom edge than its top edge and which contains a second rigid ring 21.

A shield 22 formed of a strip of heavy fabric extends across the rear portion of the outer wall 10 and is secured thereto by a portion of the stitching 16, or may be formed integral with said rear wall. A pair of shoulder straps 23 have corresponding ends fastened to the rear portion of the wall 10 in spaced apart relation to one another, either by the stitching 16, as illustrated, or by being secured around the upper ring 18, and said shoulder straps 23 extend upwardly from the wall 10 in converging relation to one another and so as to cross one another slightly above the upper edge of the shield 22, which is attached to the shoulder straps 23 by suitable fastenings 24. The shoulder straps 23 thus support the shield 22 in an extended position above the rear of the wall 10, when said shoulder straps are extended over the shoulders of a person, indicated at 25 in FIGURES 1 and 2. As seen in FIGURE 1, the shoulder straps 23 extend down across the chest of the wearer 25 and outwardly and then back inwardly through transversely spaced pairs of slots 26 in a substantially rigid bar 27, which extends transversely across the chest and in which said shoulder straps are adjustably anchored.

An upper end of a front supporting strap 28 is adjustably anchored to the bar 27 by engagement with two slots 29 thereof which are located between the pairs of slots 26, said upper strap end being passed in opposite directions through the slots 29, as seen in FIGURE 5, and then preferably around the upper edge of the bar 27 and back through the lower slot 29. A conventional snap hook 30 is secured at the other lower end of the strap 28 and detachably engages a part of the upper ring 18 at the front of the outer wall 10 and where the fold 18 is cut away, as seen at 31, in FIGURES 1 and 3.

The inner wall 9 constitutes a girdle member which fits around the body of the wearer adjacent the waist and which is held fastened thereto by tightening and tieing the drawstring 14, so that the upper fold 13 thereof is located at approximately the level at which the upper fold 17 of the outer wall is supported by the straps 23 and 28, as seen in FIGURES 3 and 4.

The bottom 11 has an opening 32, as seen in FIGURE 3, at the front of the container 8 in which is secured an inlet end 33 of the chute 34, preferably by stitching 35. The chute 34 is preferably formed of the same material as the parts 9, 10 and 11 and tapers toward its other open outlet end 36. A small ring 37 is attached by a cord 38 to the otulet end 36 and is detachably connected to the snap hook 30 while the container 8 is being used to receive fruit being picked, so that the chute 34 is folded upwardly against the outer side of the outer wall 10 and is thereby held closed to prevent any fruit being discharged therefrom. The cord 38 is attached to what constitutes an outer portion of the open end 36 to hold said open end folded against the wall 10, as illustrated in FIGURES 1 and 3.

The walls 9 and 10 combine with the bottom 11 to provide an annular open top chamber 39 in which fruit or other objects being harvested or collected can be deposited. It will be apparent that the container 8 can be conveniently carried on the body of the user 25, as illustrated in FIGURES 1 and 2, and will not interfere with the use of the hands and arms in the picking operation. The single front strap 28 will afford a minimum of obstruction to the deposit of the picked fruit, not shown, in the chamber 39.

After the chamber is filled or the picking operation completed, the fruit can be carried by the user in the container 8 in a field box or other depository, not shown, where the ring 37 can be disengaged from the snap hook 30 to release the chute 34 so that it can drop downwardly to permit the fruit to be discharged by gravity through said chute and into the field box or other storage container, disposed beneath the discharge end 36 of the chute.

It will be obvious that the rigid rings 18 and 21 will hold the outer wall 10 spaced from and substantially concentric around the inner wall or girdle portion 9 to maintain the chamber 39 extended irrespective of the amount of the fruit deposited therein.

I claim as my invention:

1. A fruit harvesting container comprising an annular inner wall, an annular outer wall and an annular bottom extending between and connected to the bottom portions of the inner and outer walls, said walls and bottom being formed of a fabric material, said inner wall forming a girdle-like member adapted to engage around the torso of a fruit picker, means for securing an upper part of said inner wall around the body of the user, and strap means connected to an upper portion of the outer wall and adapted to engage over the shoulders of the user for supporting said outer wall around the inner wall, said inner and outer walls and bottom defining an annular upwardly opening chamber in which fruit or other objects are adapted to be deposited.

2. A harvesting container as in claim 1, a rigid ring secured to the upper part of said outer wall and to which said strap means are secured for retaining the upper portion of said outer wall spaced outwardly from and concentrically around the upper portion of the inner wall.

3. A harvesting container as in claim 2, and a second rigid ring secured in and extending around the outer wall above and adjacent said bottom.

4. A harvesting container as in claim 1, a front portion of said bottom being provided with an opening, a fabric chute having an inlet end secured in said opening of the bottom and an opposite outlet end, said chute providing gravity discharge of the contents of the container when the chute is in a depending position extending downwardly from said bottom opening, and means for detachably connecting said discharge end of the chute to a part of the strap means with the chute extending upwardly and folded against the outer side of the front portion of the outer wall and with the discharge end above said inlet end for maintaining said chute in a closed position.

5. A harvesting container as in claim 1, and a fabric shield secured across the upper rear portion of the outer wall and extending upwardly therefrom and supported by said strap means.

6. A harvesting container as in claim 1, said strap means including a pair of straps secured to the upper portion of the outer wall and at the rear thereof and adapted to engage over the shoulders of the user, a bar to which portions of said straps are adjustably connected and which is supported thereby at the front of the user and above the container, and a front strap adjustably connected to an intermediate portion of said bar and to the upper portion of the outer wall at the front thereof and combining with said first mentioned straps for supporting the upper portion of the outer wall at approximately the level of the upper portion of said inner wall.

7. A harvesting container as in claim 6, and a snap hook connected to said front strap and detachably connected to the outer wall.

References Cited

UNITED STATES PATENTS

| | | | |
|---|---|---|---|
| 1,385,224 | 7/1921 | Orr | 224—5 |
| 1,454,779 | 5/1923 | Wells et al. | 150—2 |
| 1,601,624 | 9/1926 | Houghton | 224—5 |
| 2,113,876 | 4/1938 | Couch | 150—2 |
| 2,586,974 | 2/1952 | Merrion | 150—2 |

DONALD F. NORTON, Primary Examiner